(12) United States Patent
Karol et al.

(10) Patent No.: US 11,155,417 B2
(45) Date of Patent: Oct. 26, 2021

(54) IFLEX CONVEYOR SYSTEM WITH GAPPING CAPABILITY FOR EFFICIENT PRODUCT TRANSFER

(71) Applicant: Cornerstone Automation Systems, LLC, Frisco, TX (US)

(72) Inventors: Tom Karol, Frisco, TX (US); Richard Steele, Frisco, TX (US); Ikram Khan, Frisco, TX (US); Drew Ethridge, Frisco, TX (US); Andrew Lozier, Omaha, NE (US); John Heires, Omaha, NE (US); Tyler Holm, Omaha, NE (US)

(73) Assignee: Cornerstone Automation Systems, LLC, Frisco, TX (US)

( * ) Notice: Subject to any disclaimer, the term of this patent is extended or adjusted under 35 U.S.C. 154(b) by 0 days.

(21) Appl. No.: 16/897,727

(22) Filed: Jun. 10, 2020

(65) Prior Publication Data
US 2020/0385214 A1 Dec. 10, 2020

Related U.S. Application Data (60) Provisional application No. 62/859,571, filed on Jun. 10, 2019.

(51) Int. Cl.
*B65G 21/14* (2006.01)
*B65G 23/44* (2006.01)
*B65G 39/12* (2006.01)
*B65G 43/08* (2006.01)

(52) U.S. Cl.
CPC ............. *B65G 21/14* (2013.01); *B65G 23/44* (2013.01); *B65G 39/12* (2013.01); *B65G 43/08* (2013.01); *B65G 2203/0233* (2013.01); *B65G 2203/0266* (2013.01); *B65G 2203/044* (2013.01)

(58) Field of Classification Search
None
See application file for complete search history.

(56) References Cited

U.S. PATENT DOCUMENTS

| | | | | | |
|---|---|---|---|---|---|
| 3,294,216 | A | * | 12/1966 | Lawrence | B65G 21/14 198/812 |
| 3,584,731 | A | * | 6/1971 | Dahlem | B65G 21/14 198/303 |
| 4,266,650 | A | * | 5/1981 | Patel | B65G 13/12 16/368 |
| 4,852,712 | A | * | 8/1989 | Best | B65G 13/12 193/35 TE |
| 5,147,025 | A | * | 9/1992 | Flippo | B65G 13/07 193/35 TE |
| 5,456,347 | A | * | 10/1995 | Best | B65G 13/07 193/35 TE |
| 5,632,371 | A | * | 5/1997 | Best | B65G 13/07 193/35 TE |

* cited by examiner

*Primary Examiner* — Kavel Singh (57) ABSTRACT

Disclosed herein are aspects of conveyor systems and product mover systems. In one embodiment, an expandable conveyor segment, comprises an end frame; a plurality of x-bars coupled with each side of the end frame, each x-bar including: an outer bar having a first, second, and third joint point; and an inner bar having a first, second, and third joint point; wherein the inner bar is movably coupled to the outer bar by a double-shouldered spacer; and wherein each x-bar is movably coupled with at least one adjacent x-bar; and a plurality of rollers coupled between the plurality of expandable x-bars.

20 Claims, 11 Drawing Sheets

IFLEX CONVEYOR SYSTEM WITH GAPPING CAPABILITY FOR EFFICIENT PRODUCT TRANSFER

CROSS-REFERENCE TO RELATED APPLICATION

This application claims the benefit of U.S. Provisional Application Ser. No. 62/859,571, filed by Tom Karol, et al. on Jun. 10, 2019, entitled "IFLEX CONVEYOR SYSTEM WITH GAPPING CAPABILITY FOR EFFICIENT PRODUCT TRANSFER," commonly assigned with this application and incorporated herein by reference in its entirety.

TECHNICAL FIELD

This application is directed to product transfer equipment, and more specifically, a flexible conveyor having gapping capability for providing more efficient product transfer capabilities.

BACKGROUND

The retail supply chain has evolved in the last 20 years. Retail warehouses, which once served merely to hold inventory have now evolved into a more dynamic entity. A retail warehouse may be expected to perform the functions of an automated fulfillment center. As such, there may be a need for more purpose-built automation equipment. Product receiving, scanning and sorting/distribution are generally performed in a retail warehouse. With dedicated equipment and customer inventory, retail warehouse space may be limited. What is needed is compact equipment that can fit into the tight space confines of a retail warehouse and be portable enough to be moved around to make optimum use of available floor space.

BRIEF DESCRIPTION

Reference is now made to the following descriptions taken in conjunction with the accompanying drawings and illustrations in which.

DETAILED DESCRIPTION

Disclosed herein are aspects of a conveyor system that may be used with product transfer, sortation, and mover systems. Such systems may be used when transferring products into warehouses, factories, and various places where product moving, and sorting are needed. Some embodiments may employ a conveyor having a plurality of flexible conveyor segments. In some embodiments, the conveyor may include a plurality of flexible conveyor segments coupled together in series.

A complex system, consisting of different types of conveyors, scanners and sortation modules connected in series is utilized to safely and efficiently unload trucks. Each part of the system may provide an important role in efficiently unloading a trailer and subsequently transferring the boxes from the trailer to a storage location.

Traditionally, ad hoc flex conveyors have been used for moving boxes from the trailer into an intelligent gapping and sortation system, or in some cases on to a powered/non-powered conveyor. A dedicated 'gapping' conveyor may receive the boxes from the ad hoc flex system and then gaps the boxes before feeding the boxes into a scanning system. Gap between boxes may provide a barcode scanner to better read and sort boxes for better redirection and sorting the boxes for shelving or distribution. One challenge of using traditional ad hoc flex conveyors is the possibility of an increased footprint of the system, requiring more size and spacing requirements of the system because more conveyors may be needed to operate the system, and thus, increasing the cost of the overall system.

Figure 1:
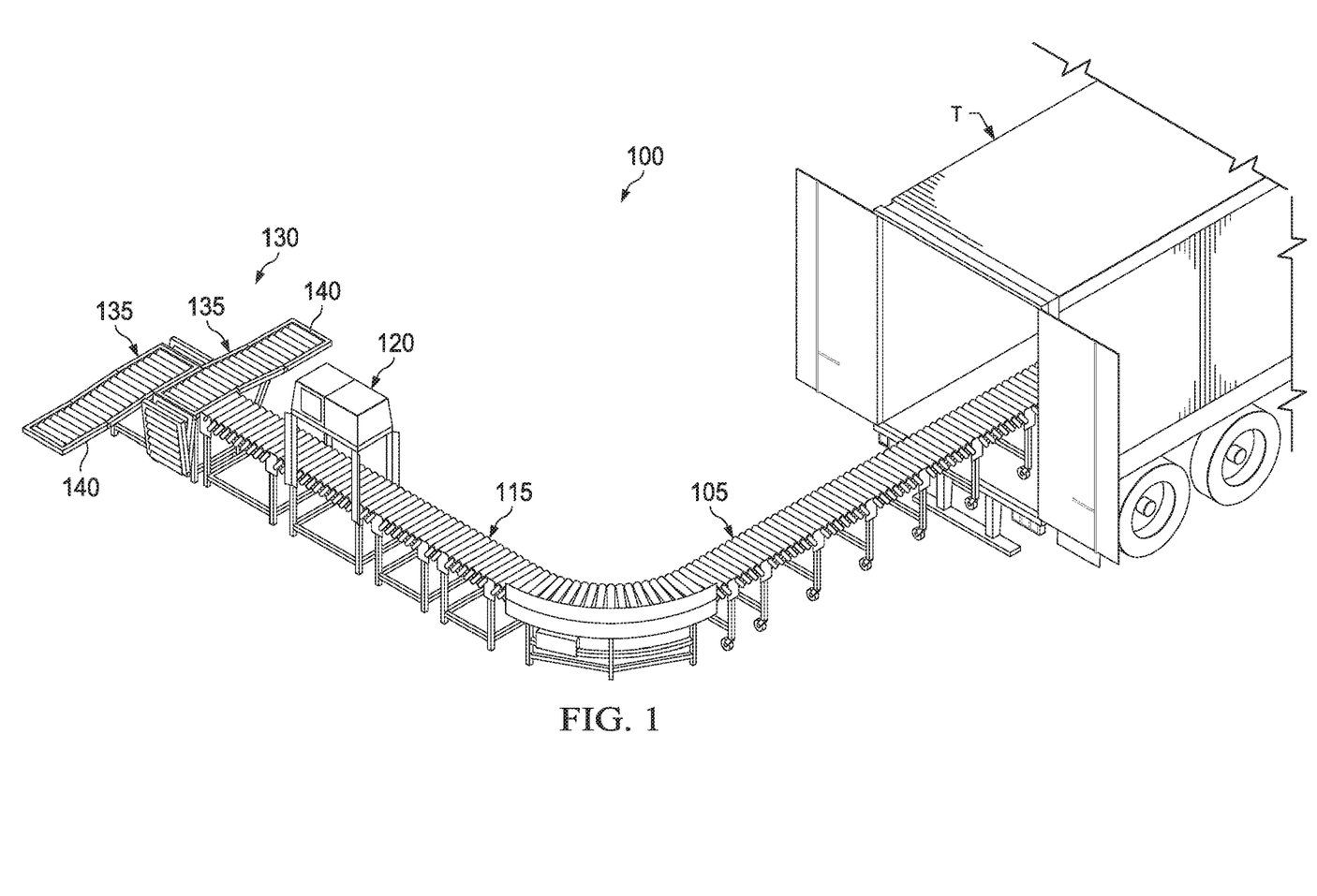
FIG. 1 illustrates an embodiment of a shown one embodiment of a product mover system according to the principles of the present disclosure.

By closing a distance from where boxes and products are unloaded, embodiments of flexible conveyors disclosed herein may improve the overall efficiency of the system enabling more product (measured in boxes/minute) to be transferred with reduced manpower requirement. The flexible conveyors according to the disclosure may also provide ergonomic benefits by lessoning time required for unloading and product movement, compared with traditional time requirements. Traditional flex conveyors used in the industry have included ad hoc conveyors whose primary purpose is solely to move the boxes from the trailer into an intelligent gapping and sortation system, or in some cases on to a powered/non-powered conveyor. A dedicated 'gapping' conveyor receives the boxes from the ad hoc flex system and then gaps the boxes before feeding the scanning system. Gaps between boxes loaded onto a system such as the system shown in FIG. 1 is critical so that when the boxes pass through the scanner, the barcodes are correctly read by the scanner and the sortation system can efficiently sort/redirect boxes such that they may be stored at the correct shelves. A traditional ad hoc flex conveyor generally increases the overall footprint of the system (more conveyors involved in running the system), and as a result, the overall cost of the system may be higher due to the extra pieces of equipment required.

Automation equipment manufacturers desire to design and build compact equipment that can fit into limited space confines of certain workspaces, such as a retail warehouse, and yet are portable enough to be moved around to make optimum use of the available floor space. Presented herein are aspects of flexible conveyors having a plurality of conveyor segments, which may be used with various product moving and storage systems and in some embodiments, may be used with an automated sortation and product movement system along with collapsible product movers that may be used in various spaces, including limited space environments. A product moving system which may be used to unload trucks and move boxes and products within a warehouse may include different types of conveyors, one or more bar code scanners and a sortation module, which in some embodiments may be connected in series.

Referring now to FIG. 1 is shown one embodiment of a product mover system 100. In this embodiment, the system 100 includes one or more incoming conveyors, such as a plurality of conveyor segments 105, which may include flexible conveyor segments and some segments that may couple together and adjust to varying floor/surface heights. The conveyor segments 105 may connect with an infeed conveyor 115. The system 100 may also include a bar code scanner 120, and at least one sortation module 130. In some embodiments, the plurality of segments may include segments 105 connected directly with or into a delivery trailer T. Some segments, in some embodiments, may be expandable conveyor and other segments may be coupled together such that the conveyor segments 105 may be able to contour and be self-supporting even on an uneven transition zone between a truck or trailer and warehouse. The plurality of conveyor segments 105 moves the product to the infeed conveyor 115 in to the bar code scanner 120.

In some embodiments, each conveyor segment 105 may include casters and may therefore be moved easily into the trailer T, and around to and from various locations in a warehouse. Each conveyor segment 105 may be flexed to various lengths and may be connected in series. As the trailer T starts to empty out, conveyor segments 105 may be pulled further into the trailer T until the trailer T is eventually unloaded. Additional conveyor segments 105 may be added in series to allow for various distances. Each conveyor segment 105 may have a logic module and when connected in series, each segment 105 may communicate with one or more controllers in the system 100.

The scanner 120 determines the direction in which the product needs to be redirected in order to be stored at desired location. The scanner 120 generates a signal that corresponds to the direction and is used by the sortation module 130. For example, a controller of the sortation module 130 may receive the signal and direct operation thereof based on the signal. The sortation module 130 receives the signal from the scanner 120 and performs a divert and sort function to enable the product to be moved in the desired direction. One embodiment of the sortation module 130 may include at least one product sorting and transfer module 135 which may comprise a direction changing transfer module and collapsible product movers 140 or wings coupled to each side thereof. The collapsible product movers 140 may be self-supporting or may be attached to another component of a product transfer system as shown in FIG. 1.

The sortation module 130 may be configured or programmed to sort products based on an identifier, such as a product identifier, that is located on the product or, for example, packaging of the product. As products travel along the conveyor segments 105 and infeed conveyor 115, the scanner 120 communicates the product identifier for each package or product container with the one or more transfer modules 135 of the sortation module 130. The scanner 120 can communicate with a controller or controllers of the transfer modules 135 to direct the operation of the transfer modules 135 for product transfer onto one or more collapsible product movers 140.

In the embodiment shown, the collapsible product movers 140 are foldable and are coupled onto the sorting and transfer modules 135, but there may be other embodiments where the product movers 140 may have independent support structures. Based on the product identifier, the transfer modules 135 will determine onto which of the collapsible product movers 140 the product needs to be transferred. Each of the transfer modules 135 may transfer the product in at least 2 flow paths, either in line or parallel with the incoming path of the infeed conveyor 115, or substantially perpendicular, either turning "right" or "left" off of the transfer modules 135. Each transfer module 135 may include may include a first and second shuttle, which may be nested and configured such that as one of the first and second shuttles may be raised to a first plane, at a substantially similar level as the plane of infeed conveyor 115, the other shuttle is lowered below the first plane. A cam system may be positioned beneath the first and second shuttles, each having a plurality of cams configured to engage the first and second shuttles to raise them to the first plane and lower them below the first plane. The first shuttle may include a plurality of rows of pulleys connected by a belt system. In one embodiment, a powered roller may be positioned beneath the rows of pulleys, wherein the powered roller may engage and turn the belts connecting the series of pulleys in each row. A frame may support the rows of pulleys and powered roller. The frame may include mounting blocks positioned beneath the rows of pulleys, the mounting blocks for engaging the cam system.

The second shuttle may include a plurality of rollers, wherein the plurality of rollers includes one or more driving (powered or motorized) rollers and a plurality of driven rollers. The plurality of rollers may be connected through a belt system, such as a network of serpentine belts wherein the driving rollers and the belt system cooperate to rotate the driven rollers of the plurality of rollers. A mounting frame may support the plurality of rollers and includes mounting blocks for engaging a cam system.

The product movers 140, in one embodiment, may include, in one embodiment, include a plurality of rollers, in some embodiments idle rollers, that facilitate the movement of a product such as a box along the desired direction. In some embodiments, the product movers may have collapsible, folding wings, such that the product movers may be collapsed and use less space on a production or warehouse floor, which may be a drawback of traditional product mover and conveyor systems. In one embodiment, the product movers may be opened or unfolded when required during operation and subsequently closed or folded in a compact manner when not in use. Thus, the product movers may be configured to be easily stored in a compact form. Portions of the product movers may be coupled via a hinge. The hinge may, in some embodiments, include mechanical stops which provide a desired range of motion, enabling the product movers to open and allow product to travel along the rollers while preventing the product movers from opening too far or failing due to excessive weight placed onto them wings. The hinge, in some embodiments, may also provide a load bearing capacity of up to 410 lbs. (static loading) and/or 62 lbs. of peak load bearing capacity (cyclic loading) before yield. The hinge designed to provide the degree of freedom for the product movers to open and close and may be designed with built in mechanical stops to not only provide a limited degree of rotation to the wings but also to enable the sub-assembly to carry the pre-determined sets of loads Referring now to FIG. 2A, there is shown a perspective view of one embodiment of a flexible conveyor 200 having a plurality of expandable conveyor segments 205 according to the disclosure. Each expandable conveyor segment 205 may be flexed, both compressed and elongated, and curve along its axis. The conveyor 200 may be used, in some embodiments, at a transition between two points along the product unloading/moving path. A plurality of conveyor segments 205 may be connected in series such that the conveyor 200 may be moved closer to products, rather than follow generally followed strategy to move the product (in batches) to the conveyor 200 and sortation modules. The conveyor 200 may be used, in some embodiments, to reduce a distance from where boxes and products are unloaded the conveyor, which may provide efficiency benefits for a product moving system by enabling more product (measured in boxes/minute) to be transferred with reduced manpower requirement and also result in product mover systems needing less equipment components. The conveyor 200 may also provide ergonomic benefits by lessoning time required for unloading and product movement, compared with traditional time requirements.

Figure 2A:
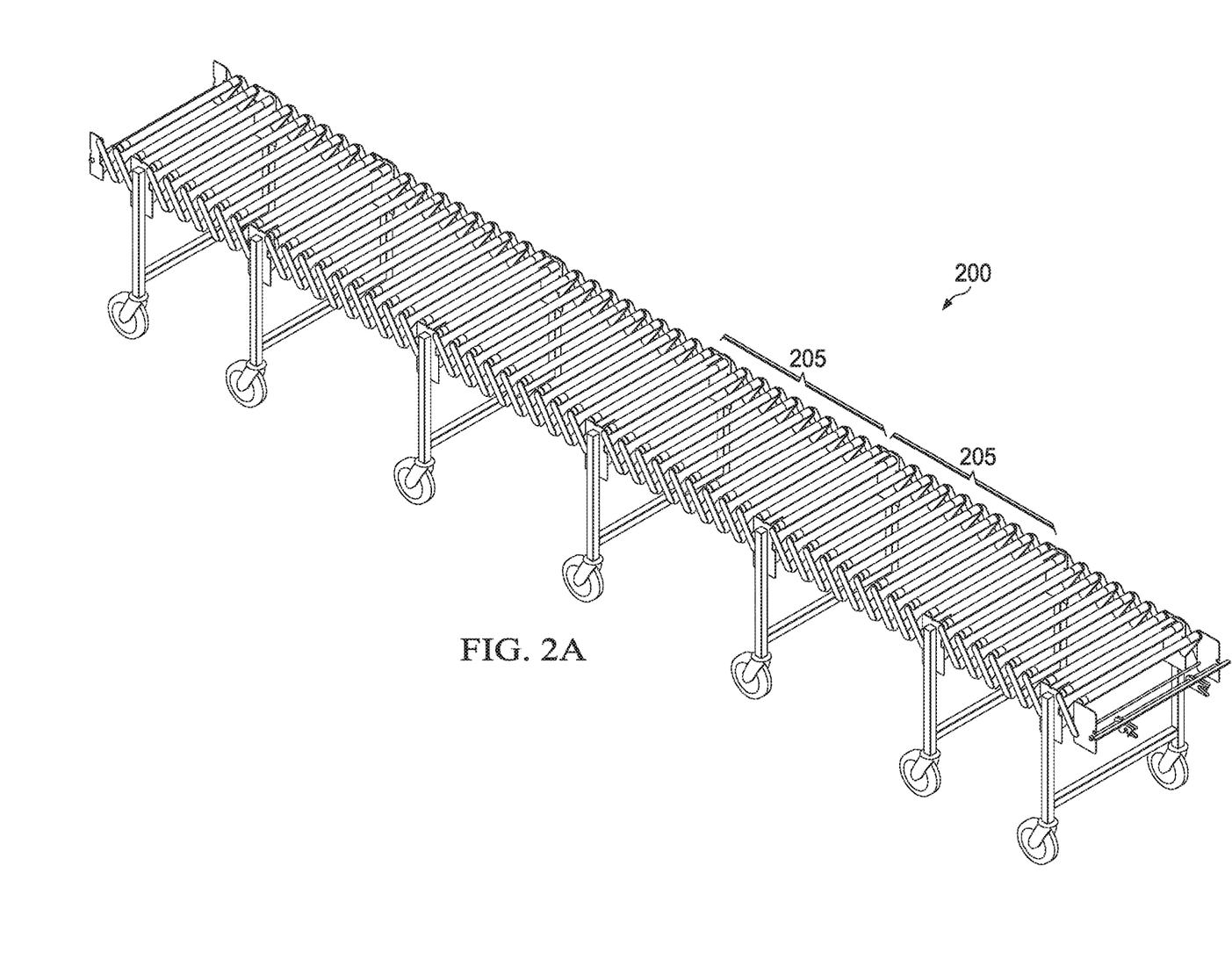
FIG. 2A is perspective view of one embodiment of flexible conveyor having a plurality of expandable conveyor segments according to the disclosure.

The conveyor segments 205 may provide all the functional advantages of a traditional flex conveyor, but in addition may maintain a constant belt tension on the rollers. In addition, some embodiments may include an electrical controls program built into the conveyor segments which may enable a plurality of sections 205 to communicate with each other, in some embodiments via an Ethernet cable, and enable a speed of each zone in the conveyor 200 to be controlled to gap boxes. With the built-in gapping feature and the ability to bend around corners, due to its flexibility, the flexible conveyor segments 205 according to the disclosure may eliminate the need for, in some embodiments, a curve conveyor, extension conveyor and gapper conveyor, which may reduce an overall equipment cost and space requirement for a conveyor system.

Figure 2B:
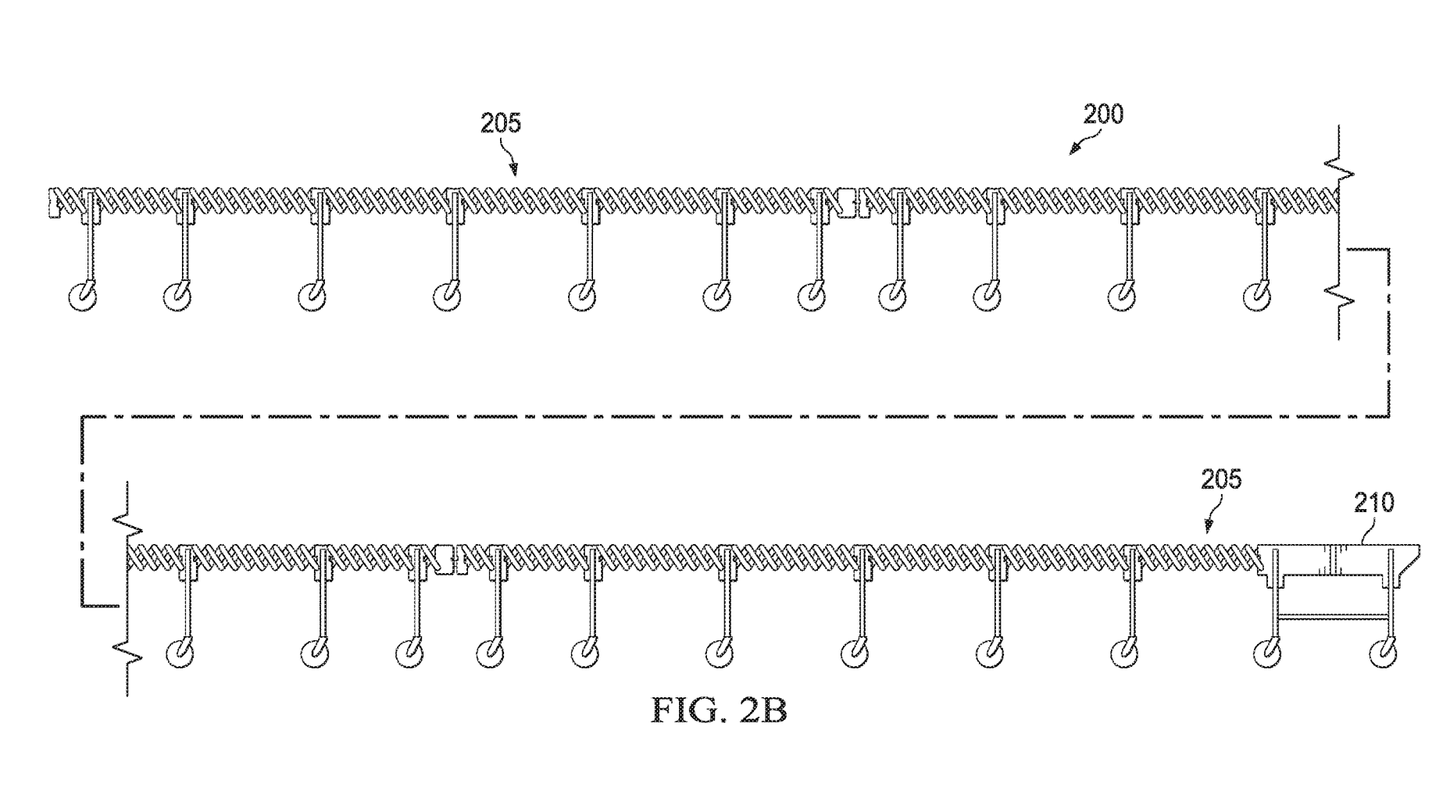
FIG. 2B is a side view of the flexible conveyor shown in FIG. 2A.

Referring to FIG. 2B there is shown a side view of an embodiment of the conveyor 200, which may include a plurality of conveyor segments 205 and at least one loading module 210. The loading module 210, in some examples, may be a receiving conveyor, which may be placed inside or outside of a trailer, such as trailer T. The loading module 210 may include a frame 215, which may be a rigid frame in order to absorb shock loads from boxes of varying size and weight from being thrown or loaded onto loading module 210. In some embodiments, boxes or product may be loaded, thrown in some examples, onto the loading module 210 from a height of at least 5 feet above the conveyor 200. In some embodiments, the loading module 210 may absorb impact loads of about 100 lbs. The frame of the loading module 210 may absorb side impact loads of 1000 lbs. when traveling at 2 mph.

Figure 3A:
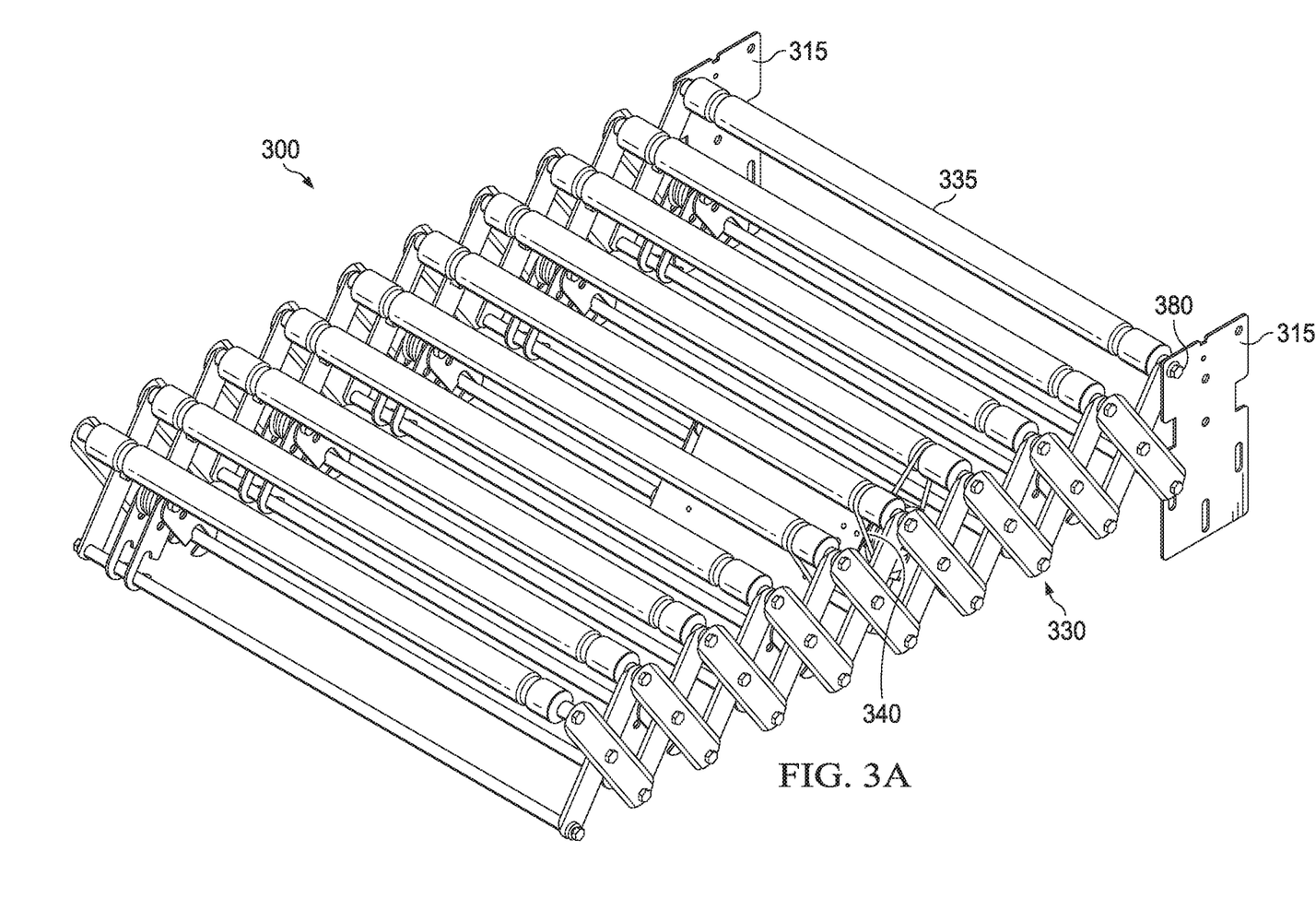
FIG. 3A is a perspective view of a conveyor segment according to principles of the disclosure.

Referring now to FIG. 3A, there is shown one embodiment of a conveyor 300 having a plurality of flexible conveyor segments 305 which may flex both length-wise and curve along its axis. Each conveyor segment 305 may include at least an end frame 315. Coupled to each side of the end frame 315 may be a plurality of x-bars 330. In some embodiments, the x-bars 330 may be expandable and/or adjustable. The x-bars 330 may provide a side-frame structure for each conveyor segment 305. A plurality of rollers 335 may be coupled between the x-bars 330 for supporting and moving product thereon. In some embodiments, the outer bars 345 and inner bars 355 of the x-bars 330 may be rotatably coupled with each other to create a scissor mechanism. By pulling or pushing on the conveyor segment 305, spacing between the plurality of rollers 335 may be minimized or maximized. The plurality of rollers 335 may, in some embodiments, be belt driven. The kinematic arrangement of the x-bars 330 may enable the belt tension on a belt 340 connecting the rollers 335 to be substantially equal with each other whether the conveyor segment 305 is fully compressed or expanded. Substantially equal belt tension may enable the conveyor 300 to provide Zero Pressure Accumulation (ZPA) in a product moving system, which ensures box are gapped before they are fed downstream of the conveyor 300. In some embodiments, the belt 340 may be driven by a motor (not shown), which in some embodiments may be positioned beneath the plurality of rollers 335, or in some embodiments, may be positioned on or supported by the end frame 315.

Figure 3B:
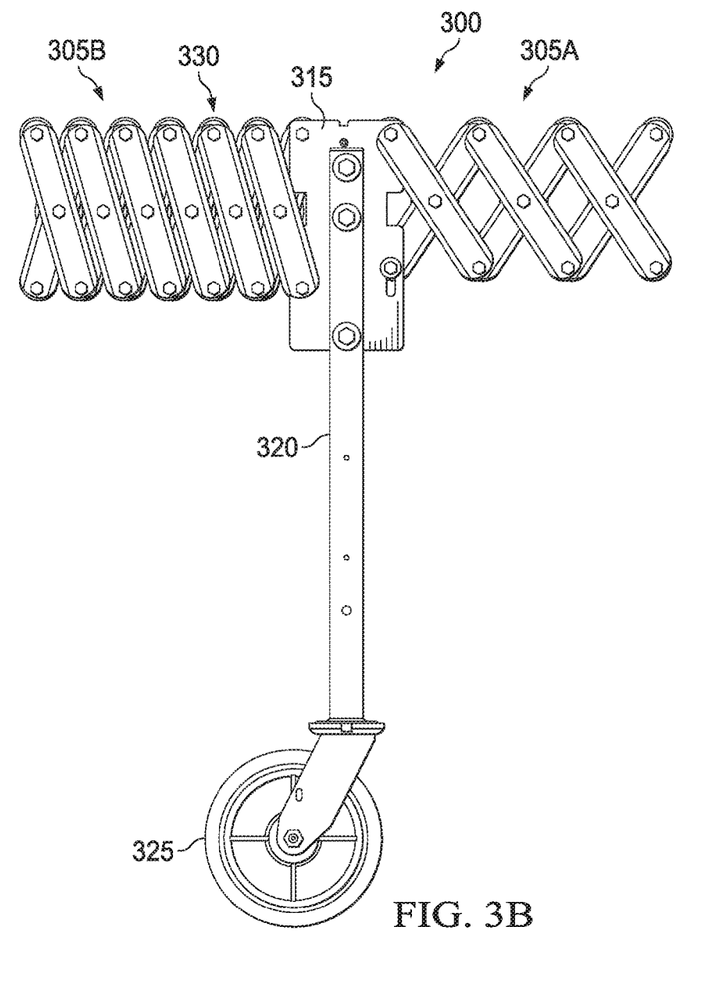
FIG. 3B is a side view of several segments connected with other to form multiple zones of a conveyor according to principles of the disclosure.
Figure 3C:
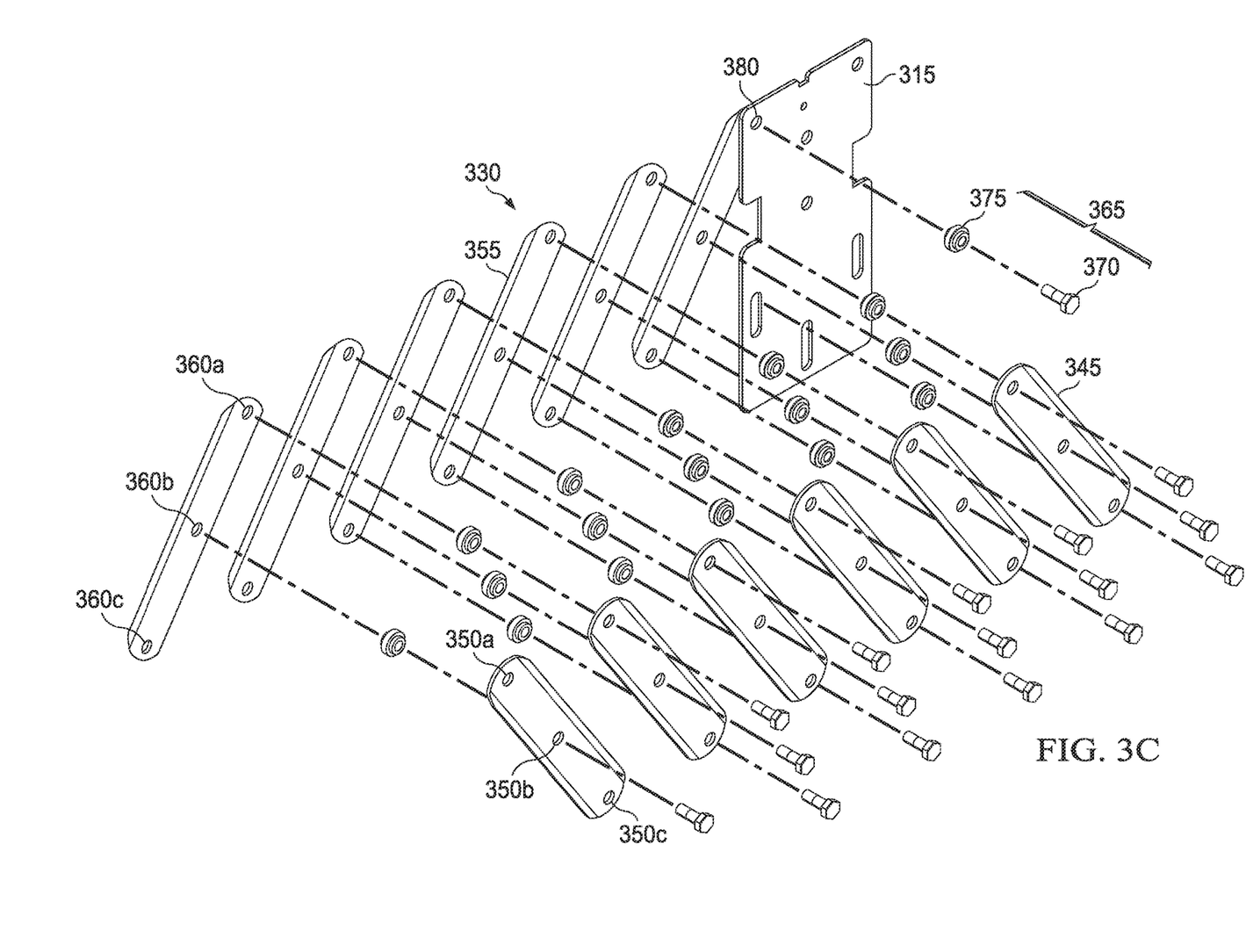
FIG. 3C is an exploded view illustrating features of the x-bars according to the disclosure.

Referring to FIG. 3B, there is shown a side view of a portion of a conveyor 300 including at least a first segment 305A and second segment 305B. The end frame 315 may be supported by legs 320, which in some embodiments may include wheels 325. The wheels 325 may be castors, or various other wheels used in industrial product moving equipment. As shown in FIG. 3C, first segment 305A may expanded while adjacent second conveyor segment 305B may be compressed. Accordingly, each conveyor segment 305 along a conveyor 300 may expand or contract/compress as needed.

Referring to FIG. 3C, there is shown an exploded view illustrating features of the x-bars 330 according to the disclosure. Each x-bar 330 may include an outer bar 345 having, in some embodiments, three coupling joint points—a first joint point 350*a*, a second joint point 350*b*, and a third joint point 350*c*. An inner bar 355 may likewise have a first, second, and third joint point 360*a*, 360*b*, and 360*c*. Each outer bar 345 may couple with the inner bar 355 at the second joint points of both 350*b* and 360*b*. The first joint point 350*a* of each outer bar 345 may couple with the first joint point 360*a* of the inner bar 355 of an adjacent x-bar 330 on one side and likewise the third joint point 355*c* of the outer bar 345 may couple with the third joint point 360*c* of the inner bar 350 of an adjacent inner bar 355 on an opposing side. Each of these joint points 350*a-c* and 360*a-c* may function as a rotation point to allow the conveyor segment 305 to expand and contract. A double-shouldered spacer 365 may be used to couple the outer bars 345 with the inner bars 355 at each of the joint points 350*a-c* and 360*a-c* and likewise to couple an end x-bar 330 with the end frame 315.

The spacer 365 may include a custom bolt 370 and washer 375, and may each include a machined surface on at least one side thereof for the x-bars 320 to rotate. The custom spacer 365 may include 2 shoulder sections protruding on either side of the washer 375. The diameters of the shoulders may be fractionally smaller than the hole sizes in the outer bars 345 and inner bars 355. The shoulders of the spacer 365 may then enter and be securely seated inside the openings in the outer bars 345 and inner bars 355. When the outer bars 345 and inner bars 355 are connected, the spacer 365 may be sandwiched between them, and thus, the shoulders on opposing sides of the washer 375 may then be inside the openings of the inner and outer bars 345 and 355. The spacer 365, and shoulders of the washer 375 seated within the openings of the inner and outer bars 345 and 355 may also maintain joint integrity of x-bar 330 during maintenance and repair procedures, enabling the bolt 370 to be removed while preventing the conveyor segment 305 from collapsing. In some embodiments, the end frame 315 may include an upper eye 380 (also shown in FIG. 3A), which may correspond and coupled with the first joint points 350*a* of an adjacent x-bar 330 coupled with the end frame 315.

Figure 3D:
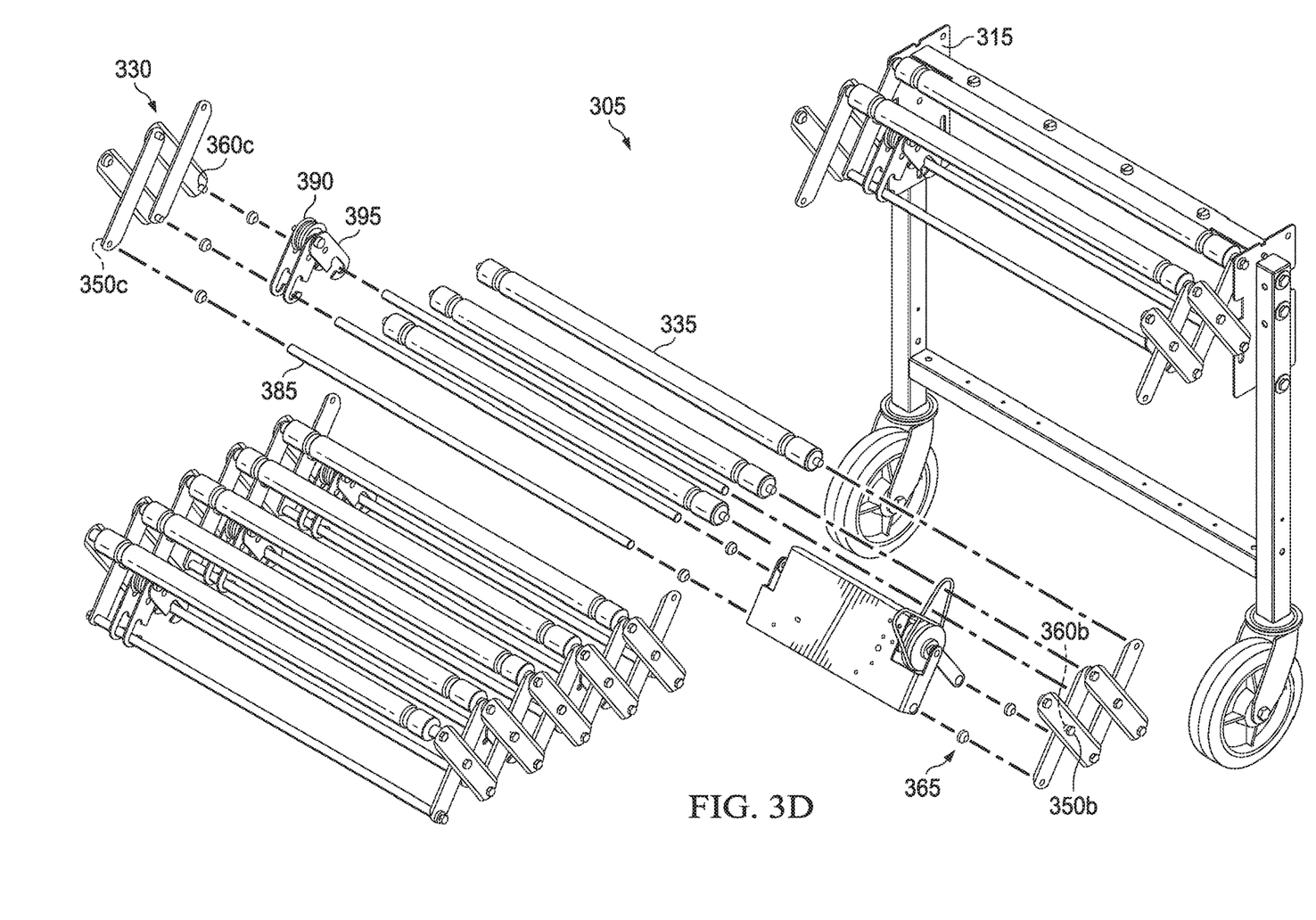
FIG. 3D is an exploded view of the conveyor segment.

Referring now to FIG. 3D, there is shown an exploded view of the conveyor segment 305. Each x-bar 330 may be rotatably coupled or hinged in a center point thereof, at or near the second joint points 350b and 360b of each of the outer bar 345 and inner bar 355, providing a pivot point near the center of each x-bar 330. In some embodiments, the rollers 335 may also be coupled to the first joint points 350a and 360a of each x-bar 330, in some embodiments by a bolt and in other embodiments using one or more spacer 365s. In some embodiments, bars 385 may be fastened to the third joint points 350c and 360c of the x-bars. The bars 385 may comprise aluminum, steel, and other metals such that the bars 385 provide additional support for the x-bars 330. In some embodiments, the rollers 335 may be connected by o-ring belts. Pulleys 390 may be mounted above the bars 385 in some embodiments. Each conveyor segment 300 may include a plurality of support members 395. Accordingly, belt tension on the rollers 335 may be held at a constant amount regardless of whether the conveyor segment 305 is in an expanded position or a collapsed position. In some embodiments, when connected in series with other conveyor segments 305, each segment 305 may act as an individual conveyor (or independent zone) such that a speed of each segment 305 may be run and controller at an independent speed.

Referring again to FIG. 3A and FIG. 3D, the plurality of rollers 335 may, in some embodiments, be interconnected by a series of belts 340, which may be stretchable rubber belts, or in some embodiments, o-rings. The belts 340 or o-rings may be mounted such that they wrap around each roller 335 on one end of the o-ring, and around the pulleys 390 on the other end of the o-ring as shown. The pulley 390 may be mounted on the bars 385. The x-bars 330 may therefore be connected with both the rollers 335 and pulleys 390 and constant tension may be applied along the length of the conveyor segment 305 whether the x-bars 330, and thus, the conveyor segment 305, are compressed or extended. As each conveyor segment 305 extends or compresses, the pulleys 390 move in a vertical direction, which may maintain a center distance between the rollers 335 and pulleys 390 to always be constant, thereby maintaining a constant tension on the belts 340, or o-rings, because the belts 340 (o-rings) may not be stretched or relaxed once they are mounted about the rollers 335 and pulleys 390. The pulley 390 may freely spin about its bearing thereby enabling the belts 340 (o-rings) to spin and drive the rollers 335 in the desired direction. The bearing of each pulley 390 and the rollers 335 may include grooves as shown in FIGS. 3A and 3D, allowing the belts 340 (o-rings) to be securely seated and prevent the belts 340 (o-rings) from laterally sliding during operation. In some embodiments, a motor may be functionally connected with at least one of the plurality of rollers 335 or alternatively, the pulleys 390 and may be used to drive or turn at least one of the rollers 335 or pulleys 390. The belts 340 may maintain constant tension between the rollers 335 and pulleys 390 enabling a substantially constant belt tension to provide Zero Pressure Accumulation (ZPA) in the product moving system as discussed herein.

Figure 4A:
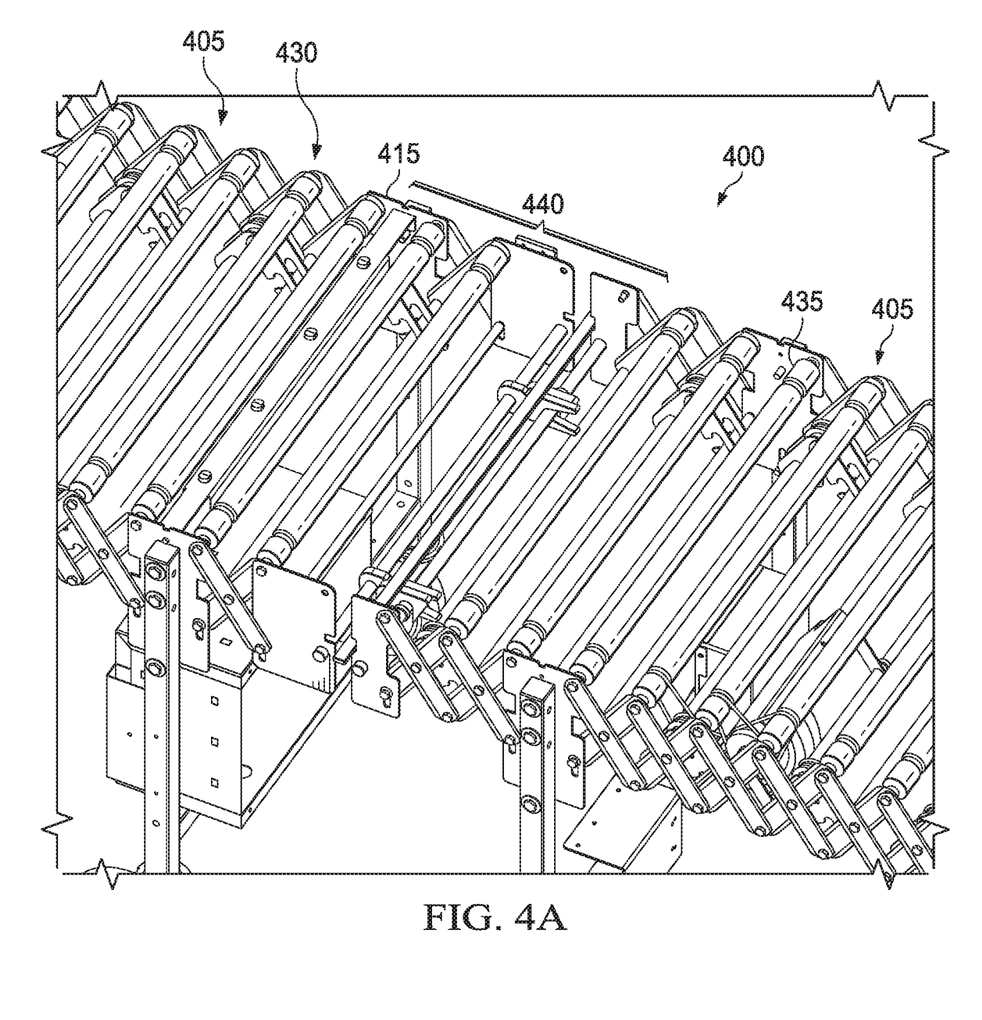
FIG. 4A shows another embodiment of an expandable conveyor according to the disclosure.

Referring now to FIG. 4A, there is shown another embodiment of a conveyor 400 according to the disclosure. The conveyor 400 may include a plurality of segments 405, which may be constructed similarly to segments 305 shown in FIGS. 3A-3C and described hereinabove. Each segment 405 may include a plurality of x-bars coupled with an end frame 415 and having a plurality of rollers 435 positioned between the x-bars 330. In some embodiments, the segments 405 may be latched together via a latch assembly 440. In some embodiments, the latch assembly 440 may hold multiple conveyor segments 405 together mechanically over uneven surfaces and the latch assembly 440 may be opened from either side of the conveyor 400.

In some embodiments, each conveyor segment 405 may be controlled via a photoeye sensor. The photoeye sensor may be placed within the end frame 415, or may be placed at various other positions along the conveyor segment 405. When the photoeye sensor on a segment 405 is blocked for a pre-determined amount of time, the photoeye sensor may send a signal to a drive card, which may indicate presence of a box, which may pass a run signal to the motor. The motor may then run the plurality of rollers 435 driving the box forward. In some embodiments, the entire process from the sensor sending the signal to the drive card to the motor (not shown) driving the box forward may take only a few milliseconds. Once the box has been pushed forward and the zone (conveyor segment 405) has been cleared, the photoeye sensor being unblocked initiates a signal at the drive card to stop the rollers until the photoeye is blocked again. In some embodiments, the conveyor segments 405 may communicate with each other which may allow for a synchronized start-stop of each segment 405 (zone). This cyclic method of starting and stopping the conveyor results in creating a Zero Pressure Accumulation (ZPA) which ensures box are gapped before they are fed downstream, allowing boxes on the conveyor 400 to be "gapped." Gapping enables boxes to be scanned correctly at the scanner module (such as module 120) further downstream. A gapping function of the conveyor segments 405 may eliminate the need for a specialized gapping conveyor traditionally used in a traditional conveyor system.

Multiple segments 405 may be connected in series through the Ethernet to create a continuous strand of smart flexible conveyor segments 405 of the conveyor 400. The plurality of segments 405 may be connected both mechanically and electrically. In some embodiments, the electrical connection may include a 9-pin connector such that each segment may have its own specific IP address assigned thereto. In some embodiments, once connected, each segment 405 may be dynamically configured to determine its individual IP addresses on the network through Ethernet.

Figure 4B:
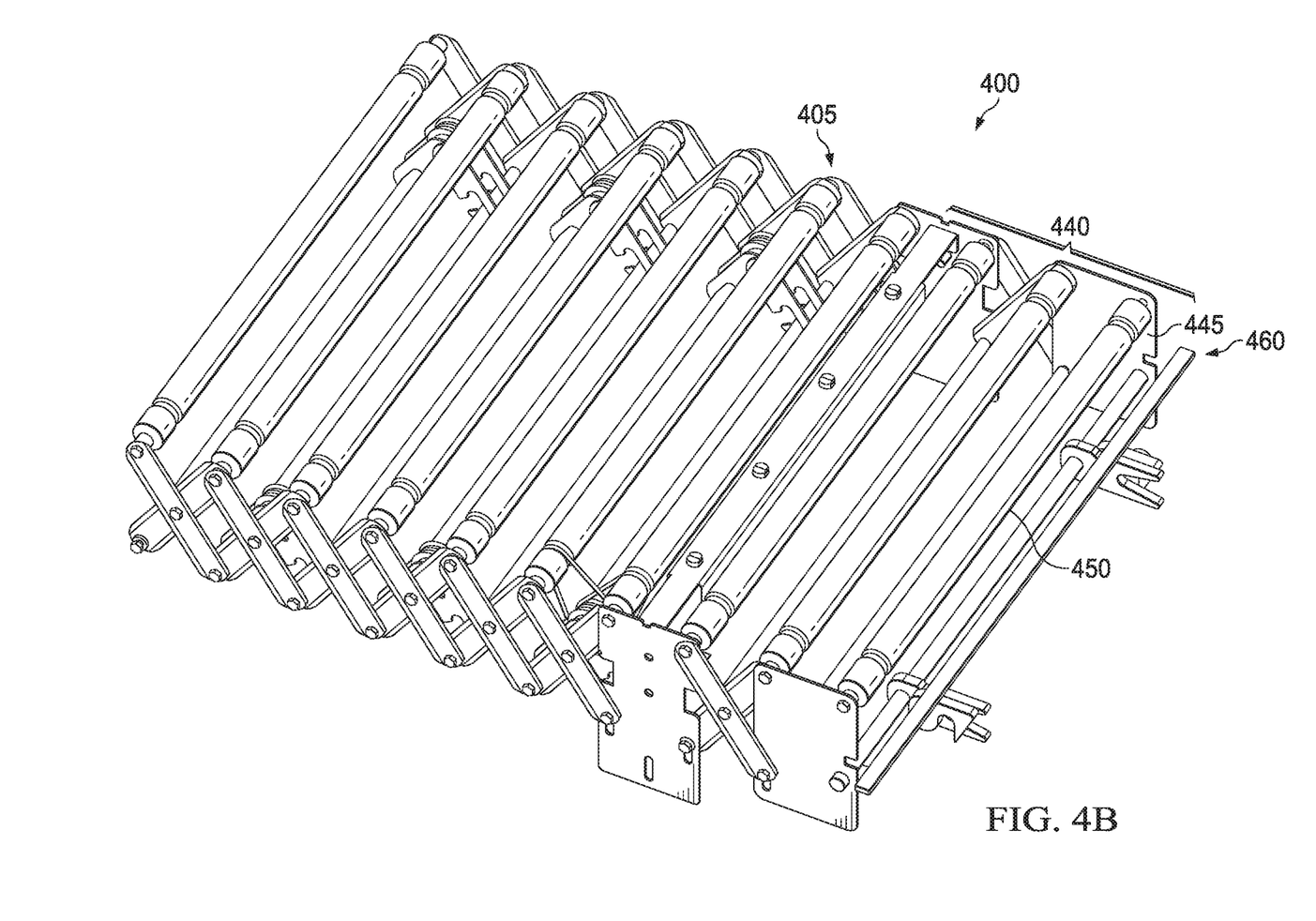
FIG. 4B illustrates an embodiment of a conveyor segment 405 of the expandable conveyor 400 shown in FIG. 4A.
Figure 4C:
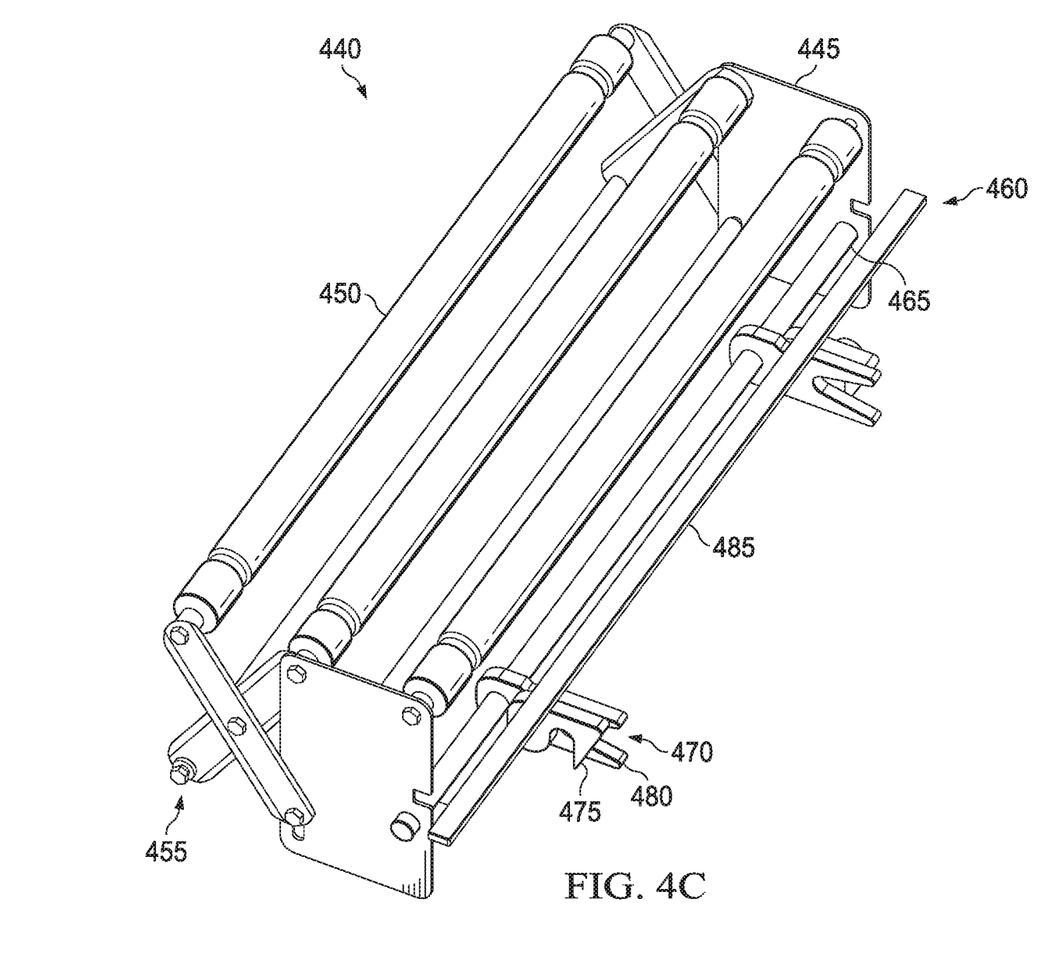
FIG. 4C illustrates one embodiment of a latch assembly which may comprise a portion of the conveyor segment shown in FIG. 4B.

Referring to FIG. 4B and FIG. 4C, there is shown an embodiment of a conveyor segment 405 of the conveyor 400 and the latch assembly 440. The latch assembly 440 may include a latch frame 445, which in some embodiments, may be a mounting plate. In some embodiments, the latch frame 445 may include one or more rollers 450 coupled there between. The latch assembly 440 may also include at least one x-bar 455, which in some embodiments may couple between the end frame 415 and latch frame 445. A support assembly 460, may be coupled between and coupled the latch frames 445. In some embodiments, the support assembly may be a weldment and be welded to the latch frames.

Referring to FIG. 4C, there is shown a detailed view of the latch assembly 440. The latch assembly 440 may include a support bar 465 coupled between the latch frame 445. A latch may be coupled to the support bar, and in some embodiments, there may be two or more latches 470. The latch 470 may include an upper opening latch member 475 and a stationary lower latch member 480, and a tie bar 485 coupled onto the upper latch member 475. The tie bar 485 may allow an operator to latch or unlatch the adjacent conveyor segment 405 from either side of the conveyor 400. In some embodiments, the tie bar 485 may extend between the two or more latches 470, and in some embodiments, extend beyond the latches 470 and span at least the width of the latch assembly 440. In some embodiments, the latch 470 may couple to and about a bar of an adjacent segment 405, such as the bars 385 shown and described in FIG. 3D.

The latch assembly 440 may hold each conveyor segment 405 together over uneven surfaces and may be operated from one side. The latch assembly 440 may be placed on either side of each conveyor segment 405 to be ensure a secure connection between conveyor segments 405. The latch assembly 440 may include a support bar 460 a latch may be placed on either side of each segment and may be attached to each other by a tie bar, which may allow an operator to latch or unlatch the segment 405 from either side. In some embodiments the latch assembly 440 may incorporates at least two latches 470, providing 2 points of contact, to provide a secure connection point between adjacent conveyor segments 405 while still allowing for rotational freedom or each segment 405. The latches 470 may be aligned as such that a "waterfall" effect is created between two connected segments 305, which prevents conveyed boxes or items from becoming stuck between conveyors. These latches assemblies 440 may be designed to attach a segment 405 to any other part of a product mover or conveyor system, such as system 100 shown in FIG. 1.

Figure 4D:
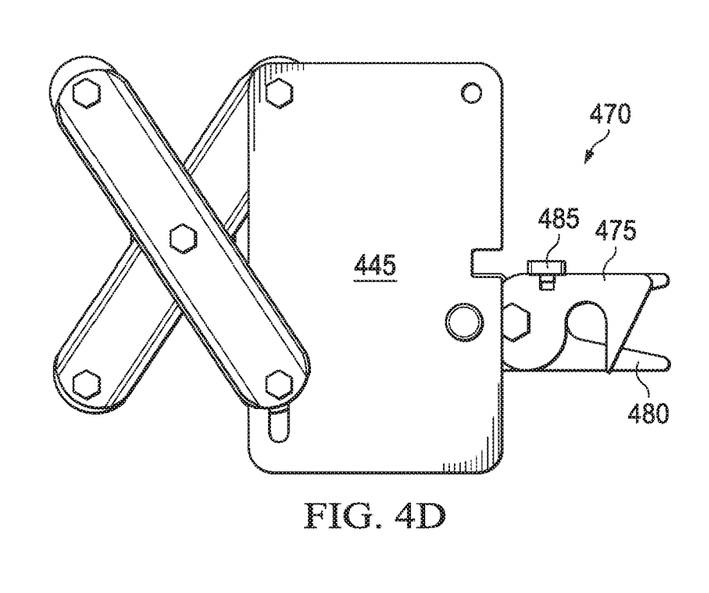
FIG. 4D is a side view of the latch assembly with the latch member shown in a closed position.
Figure 4E:
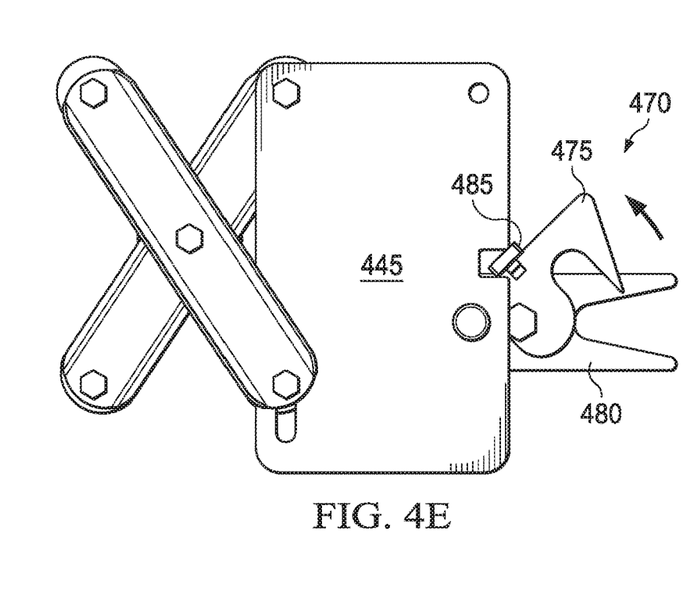
FIG. 4E is a side view of the latch assembly with the latch member shown in an open position.

FIG. 4D is a side view of the latch assembly 440 with the upper opening latch member 475 and tie bar 485 of the latch 470 shown in a closed, or latched position over the stationary latch member 480. FIG. 4E illustrates the latch assembly with the upper opening latch member 475 of the latch 470 shown in an open position over the stationary latch member 480.

A portion of the above-described apparatus, systems or methods, such as, e.g., a controller for the conveyor system or for each conveyor segment, and the transfer module controller, may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments, such as, e.g., a controller for the conveyor system or for each conveyor segment, and the transfer module controller, may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

Disclosed herein are aspects of conveyors having a plurality of segments having flexibility in their frames such that each segments may flex and curve along its primary axis.

Those skilled in the art to which this application relates will appreciate that other and further additions, deletions, substitutions and modifications may be made to the described embodiments.

Various embodiments of a flexible conveyor have been disclosed herein. In some embodiments, a smart flexible conveyor segment may have an ability to expand and contract along its axis. The flexible conveyor may have a minimal footprint when not in use and require minimal storage space. Some embodiments of flexible conveyor segments according to the disclosure may be expanded to a desired length to take a conveyor system as close as possible to the product being unloaded from a truck in order to provide a more efficient product transfer than traditional conveyor systems can provide. In one embodiment, a flex conveyor may include six zones or conveyor segments, each driven by a separate drive motor. The speed of each motor (and subsequently each zone/segment) may be controlled via a control program which may be stored, in some embodiments, on a processor such as, e.g., a drive card. Boxes travelling along various zones or segments may be manipulated such that the gaps between each box may be opened or closed, which may facilitate fewer error when scanning and sorting the boxes further downstream in the process. Multiple segments of one embodiment of the flex conveyor may be connected in series, electrically via an Ethernet cable, such that the conveyors may communicate with each other. Each conveyor segment may then be integrated to create an intelligent conveyor system.

Some claims may include the following features: A conveyor, comprising a plurality of segments, each segment including a frame, the frame comprising a plurality of x-bars on both sides of the frame, wherein the x-bars may be flexed length-wise along a horizontal axis; a plurality of rollers coupled within the frame; a plurality of belts for driving the plurality of rollers; and a latch for connecting each segment to an adjacent segment. In some embodiments, each conveyor segment may include a controller. In some embodiments, each segment may include a photo sensor for sensing when a box or product may be positioned on the plurality of rollers. In some embodiments, the controller may include a processor configured to receive signals from the photo sensor and activate a drive system, such as a motor and pulleys, to drive the plurality of rollers to move product across the segment to an adjacent segment. In some embodiments, each segment may be connected electronically with adjacent segments and each segment may have its own IP address within the conveyor system. In some embodiments, once connected, each segment may automatically determine their individual IP addresses through an Ethernet connection.

Aspects disclosed herein include:

Aspect A: An expandable conveyor segment, comprising an end frame; a plurality of x-bars coupled with each side of the end frame, each x-bar including: an outer bar having a first, second, and third joint point; and an inner bar having a first, second, and third joint point; wherein the inner bar is movably coupled to the outer bar by a double-shouldered spacer; and wherein each x-bar is movably coupled with at least one adjacent x-bar; and a plurality of rollers coupled between the plurality of expandable x-bars; and Aspect B: An expandable conveyor system, comprising two or more conveyor segments coupled together via a latch assembly, wherein each conveyor segment includes: an end frame; a plurality of x-bars coupled with each side of the end frame, each x-bar including: an outer bar having a first, second, and third joint point; and an inner bar having a first, second, and third joint point; wherein the inner bar is movably coupled to the outer bar by a double-shouldered spacer; and wherein each x-bar is movably coupled with at least one adjacent x-bar; and a plurality of rollers coupled between the plurality of expandable x-bars; and wherein the latch assembly includes: a latch assembly frame; at least one x-bar for coupling the latch assembly to the end frame of the conveyor segment; at least one roller coupled between each side of the latch frame; and at least one latch.

Aspects A and B may have one or more of the following additional elements in combination: Element 1: wherein each of the plurality of rollers are coupled between the first joint point of each outer bar;

Element 2: further comprising a plurality of support bars coupled below the plurality of rollers and coupled between the third joint points of each inner bar;

Element 3: wherein the outer and inner bars are rotatably coupled together;

Element 4: wherein double-shouldered spacer includes a bolt and a washer, wherein each bolt includes at least one machined surface on one side thereof and the washer includes a protruding shoulder on both sides of the washer;

Element 5: further comprising a latch assembly, the latch assembly including at least: a latch assembly frame; at least one x-bar for coupling the latch assembly to the end frame of the conveyor segment; at least one roller coupled between each side of the latch frame; and at least one latch;

Element 6: wherein the at least one latch includes an upper latch member, a stationary latch member, and a tie bar coupled onto the upper latch member;

Element 7: wherein the latch is coupled between the two sides of the latch frame by a support bar positioned beneath the at least one roller;

Element 8: further comprising a belt positioned about the plurality of rollers;

Element 9: wherein the belt is driven by a motor;

Element 10: further including a plurality of pulleys positioned below the plurality of rollers;

Element 11: wherein the each of the plurality of belts is positioned about the plurality of rollers on one end and about a plurality of pulleys on an opposing end, wherein the belt is configured to maintain constant tension about the plurality of rollers and pulleys;

Element 12: further comprising a photo sensor configured to sense when an item is positioned on the plurality of rollers; and Element 13: further comprising a controller, the controller including a processor configured to receive signals from the photo sensor and activate a drive system coupled with the plurality of rollers.

Further additions, deletions, substitutions and modifications may be made to the described embodiments.

What is claimed is:

1. An expandable conveyor segment, comprising:
an end frame;
a plurality of x-bars coupled with each side of the end frame, each x-bar including:
an outer bar having a first, second, and third joint point; and
an inner bar having a first, second, and third joint point;
wherein the inner bar is movably coupled to the outer bar by a double-shouldered spacer; and
wherein each x-bar is movably coupled with at least one adjacent x-bar;
a plurality of rollers coupled between the plurality of expandable x-bars; and
a latch assembly, the latch assembly including:
a latch assembly frame, the latch assembly frame including at least one x-bar for coupling the latch assembly to the end frame of the conveyor segment, at least one roller coupled between each side of the latch frame, and at least one latch;
wherein the at least one latch includes an upper latch member, a stationary latch member pivotally coupled with the upper latch member, and a lateral tie bar coupled onto the upper latch member; and
wherein the latch is coupled between the two sides of the latch frame by a lateral support bar positioned beneath the at least one roller.

2. The conveyor segment according to claim 1, wherein each of the plurality of rollers are coupled between the first joint point of each outer bar.

3. The conveyor segment according to claim 2, further comprising a plurality of support bars coupled below the plurality of rollers and coupled between the third joint points of each inner bar.

4. The conveyor segment according to claim 1, wherein the outer and inner bars are rotatably coupled together.

5. The conveyor segment according to claim 1, wherein double-shouldered spacer includes a bolt and a washer, wherein each bolt includes at least one machined surface on one side thereof and the washer includes a protruding shoulder on both sides of the washer.

6. The conveyor segment according to claim 1, further comprising a plurality of belts positioned about the plurality of rollers.

7. The conveyor segment according to claim 6, wherein the each of the plurality of belts is positioned about the plurality of rollers on one end and about a plurality of pulleys on an opposing end, wherein the belt is configured to maintain constant tension about the plurality of rollers and pulleys.

8. The conveyor segment according to claim 1, further comprising a photo sensor configured to sense when an item is positioned on the plurality of rollers.

9. The conveyor segment according to claim 8, further comprising a controller, the controller including a processor configured to receive signals from the photo sensor and activate a drive system coupled with the plurality of rollers.

10. The conveyor segment according to claim 9, wherein the drive system includes a drive card associated with a motor, wherein the drive card is configured to start and stop the motor according to the signals received from the photo sensor.

11. The conveyor system according to claim 10, wherein the starting and stopping of the motor results in the conveyor segment operating with Zero Pressure Accumulation (ZPA).

12. The conveyor system according to claim 11, wherein the starting and stopping of the motor results in the conveyor segment operating with Zero Pressure Accumulation (ZPA).

13. An expandable conveyor system, comprising:
two or more conveyor segments coupled together via a latch assembly, wherein each conveyor segment includes:
an end frame;

a plurality of x-bars coupled with each side of the end frame, each x-bar including:
an outer bar having a first, second, and third joint point; and
an inner bar having a first, second, and third joint point;
wherein the inner bar is movably coupled to the outer bar by a double-shouldered spacer; and
wherein each x-bar is movably coupled with at least one adjacent x-bar; and
a plurality of rollers coupled between the plurality of expandable x-bars;
wherein the latch assembly includes:
a latch assembly frame;
at least one x-bar for coupling the latch assembly to the end frame of the conveyor segment;
at least one roller coupled between each side of the latch frame; and
at least one latch, wherein the at least one latch includes an upper latch member, a stationary latch member pivotally coupled with the upper latch member, and a lateral tie bar coupled onto the upper latch member; and
wherein the at least one latch is coupled between the two sides of the latch frame by a lateral support bar positioned beneath the at least one roller.

14. The conveyor system according to claim 13, wherein each of the plurality of rollers are coupled between the first joint point of each outer bar.

15. The conveyor system according to claim 14, further comprising a plurality of support bars coupled below the plurality of rollers and coupled between the third joint points of each inner bar.

16. The conveyor system according to claim 15, further including a plurality of pulleys positioned below the plurality of rollers.

17. The conveyor system according to claim 13, wherein double-shouldered spacer includes a bolt and a washer, wherein each bolt includes at least one machined surface on one side thereof.

18. The conveyor system according to claim 13, further comprising a photo sensor configured to sense when an item is positioned on the plurality of rollers.

19. The conveyor system according to claim 18, further comprising:
a photo sensor configured to sense when an item is positioned on the plurality of rollers; and
a controller, the controller including a processor configured to receive signals from the photo sensor and activate a drive system coupled with the plurality of rollers.

20. The conveyor system according to claim 19, wherein the drive system includes a drive card associated with a motor, wherein the drive card is configured to start and stop the motor according to the signals received from the photo sensor.

* * * * *